(12) United States Patent
Ahmad et al.

(10) Patent No.: US 8,560,577 B1
(45) Date of Patent: Oct. 15, 2013

(54) METHOD FOR COORDINATING STATS COLLECTION AND ANALYSIS AMONG MULTIPLE HOSTS

(75) Inventors: Irfan Ahmad, Mountain View, CA (US); Ajay Gulati, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 372 days.

(21) Appl. No.: 12/834,188

(22) Filed: Jul. 12, 2010

(51) Int. Cl.
*G06F 7/00* (2006.01)
*G06F 17/30* (2006.01)

(52) U.S. Cl.
USPC .......................................................... 707/803

(58) Field of Classification Search
USPC .......................................................... 707/803
See application file for complete search history.

(56) References Cited

U.S. PATENT DOCUMENTS

| | | | | |
|---|---|---|---|---|
| 5,592,432 | A | * | 1/1997 | Vishlitzky et al. ........ 365/230.03 |
| 6,199,068 | B1 | * | 3/2001 | Carpenter ............................. 1/1 |
| 2006/0288026 | A1 | * | 12/2006 | Zayas et al. ................... 707/101 |
| 2007/0106992 | A1 | * | 5/2007 | Kitamura ..................... 718/104 |

\* cited by examiner

*Primary Examiner* — Shyue Jiunn Hwa
*Assistant Examiner* — Muluemebet Gurmu

(57) ABSTRACT

Two shared data structures are maintained in a storage unit for coordinating statistic collection among multiple hosts that share the storage unit. The first data structure stores information about the number of hosts that possess slots within the second data structure and identifying information about the slots. The second data structure maintains statistics of each of the multiple hosts. By using this first data structure, hosts can be added to and deleted from the second data structure in an organized manner.

19 Claims, 7 Drawing Sheets

US 8,560,577 B1

METHOD FOR COORDINATING STATS COLLECTION AND ANALYSIS AMONG MULTIPLE HOSTS

BACKGROUND

Modern data centers often have a multi-tier configuration wherein a front end server accesses one or more layers of middle-tier and back-tier servers for various services. One example of a back-end server is a storage array. Storage arrays form the backbone of modern data centers by providing consolidated data access to multiple applications simultaneously. Increasingly, organizations are moving towards consolidated storage, either using block-based access over a Storage Area Network (SAN) or file-based access over Network-Attached Storage (NAS) systems. A Storage Area Network is a network whose primary purpose is the transfer of data between computer systems and storage elements. Easy access from anywhere at anytime, ease of backup, flexibility in allocation and centralized administration are some of the advantages of storage arrays.

When multiple hosts share a storage array, access to the storage arrays by the different hosts is typically managed. For this purpose, it is desirable to aggregate, amongst the hosts, the input/output (IO) statistics of each host for optimal operational efficiency. According to a method described in U.S. patent application Ser. No. 12/260,041, filed Oct. 28, 2008, the entire contents of which are incorporated by reference herein, a shared file may be used to store the relevant IO statistics of each of the hosts. The shared file is accessed by each of the hosts and updated by each of them in a decentralized manner to reflect their current IO statistics. Shared files also provide the benefit of fault containment.

When a new host is added and configured to have shared access to the storage array, an entry for the new host is added to the shared file. As such, the size of this shared file grows over time as additional hosts are added and configured to have shared access to the storage array. When hosts are taken off-line, the corresponding entries in the shared file should be deleted so that the size of the shared file does not become unreasonably large and IO statistics maintained for such hosts are not used in computing any aggregate IO statistics.

SUMMARY

One or more embodiments of the present invention provide two shared data structures in a storage unit for coordinating statistic collection among multiple hosts that share the storage unit. The first data structure stores information about the number of hosts that possess slots within the second data structure and identifying information about the slots. The second data structure maintains statistics of each of the multiple hosts. By using this first data structure, hosts can be added to and deleted from the second data structure in an organized manner.

A method of coordinating collection of statistics from multiple hosts sharing a common resource, using first and second shared data structures, according to an embodiment of the present invention, includes the steps of retrieving the first data structure that stores slot identifiers, generating a unique slot identifier, updating a count value of the first data structure, adding an entry to the second data structure and storing the generated unique slot identifier in the entry, and updating a count value of the second data structure.

A method of managing first and second shared data structures that are used in coordinating collection of statistics from multiple hosts sharing a common resource, according to an embodiment of the present invention includes the steps of retrieving a version number of a host sharing the common resource, reading a version number stored in the first data structure, and determining that the retrieved version number is the same as the version number stored in the first data structure, and after said determining, adding an identifier of the host in the first data structure and updating a count value of the first data structure.

A method of managing first and second shared data structures that are used in coordinating collection of statistics from multiple hosts sharing a common resource, according to another embodiment of the present invention includes the steps of retrieving a key associated with a shared data structure, reading a key stored in the shared data structure, and comparing the retrieved key with the key stored in the shared data structure to determine if the shared data structure has been corrupted. The shared data structure in this embodiment may be the first data structure or the second data structure.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1A:
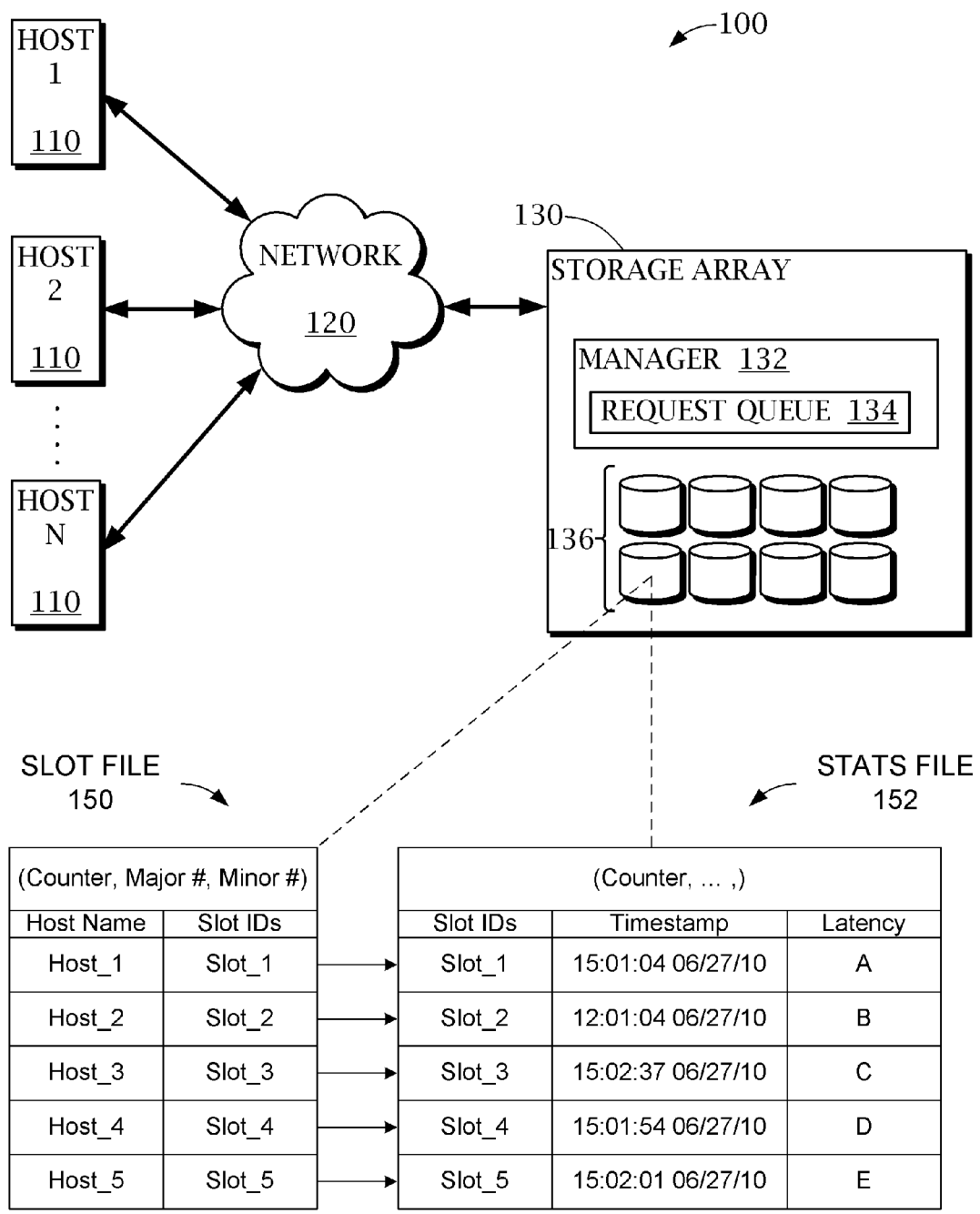
FIG. 1A illustrates a system having a plurality of hosts accessing a common storage array, which may benefit from one or more embodiments of the present invention.

FIG. 1A is a block diagram that shows by way of example a system having a plurality of hosts 110 connected through a network 120 to a shared resource such as storage array 130. There may be any number N of hosts 110, each of which may comprise a general purpose computer system having one or more applications, virtual machines, or other entities, accessing data stored on storage array 130. Network 120 may be a wide area network a local area network, or a network hosting a protocol especially suited for storage arrays, such as Fibre Channel, iSCSI, HyperSCSI, etc. For example network 120 may comprise one or more of Fibre Channel switches. Storage array 130 may be any type of storage array such as a network-attached storage (NAS) filer or a blocked-based device over a storage area network (SAN). Storage array 130 may include a manager 132 and an array of devices 136 (e.g., disks). Manager 132 is a computer program executing on one or more processors, which may be implemented as an appliance or a plurality of appliances working in tandem. Manager 132, may, for example, comprise a plurality of storage processors, as generally understood in the art of storage arrays. While storage arrays are typically made up of a plurality of disks, it should be recognized that as prices for solid-state non-volatile storage devices fall, they are increasingly taking the place of rotating disk storage media. The use of the term, "disk" herein, should therefore not be construed as limited only to rotating disk storage media, but also what is become known as solid state disks, or "SSDs."

Manager 132 maintains a request queue 134, which is a list of pending IO requests that may be satisfied in any order. Each request comprises a request to read and/or write data to or from storage array 130. Each read request identifies an address, address range or other identifier of the data to be read whereas write requests include data to be written along with an identifier for a location in the array where the data is to be written. Each request that is pending in request queue 134 corresponds to a request from one of hosts 110. QoS policy for hosts 110 governs their accesses to storage array 130 in the manner described in U.S. patent application Ser. No. 12/260,041.

The array of devices 136 stores a slot file 150 and a stats file 152. In the embodiment of the present invention described herein, files are used to store the data needed to manage and coordinate collection and analysis of statistics among hosts 110. In alternative embodiments, other data structures may be used, e.g., raw blocks on a shared storage partition, or maintained by one of hosts 110 and communicated to each other using network communication.

Slot file 150 includes a header section that maintains a counter, a major version number, and a minor version number. Slot file 150 also includes a table, where a first column stores host ID information and a second column stores slot ID information. Additional columns may be added to slot file 150 to support additional features. The value of the counter included in the header of slot file 150 reflects the total number of rows that are included in this table.

Stats file 152 includes a header section that maintains a counter. Stats file 152 also includes a table, where a first column stores a slot ID, a second column stores a timestamp, and additional columns (only one of which is shown in FIG. 1) each store IO statistics. In one embodiment, the total size of all columns included in a row is 512 bytes. The value of the counter included in the header of stats file 152 reflects the total number of rows that are included in this table. The timestamp in a given row provides a record of the latest access made by the host corresponding to that row. The timestamp may be a record of the time and date of the latest access, as shown in FIG. 1A, or may be a counter that gets incremented by the host when it updates its IO statistics. In the embodiment where counters are used as timestamps, each host remembers the counter values of the other hosts. If a host notices that some other host's counter has not been updated within a threshold amount of time, the host concludes that the other host is inactive. Further details on how this timestamp is used to identify inactive hosts are provided below.

As shown in FIG. 1A, a relationship exists between stats file 152 and slot file 150. Each of the slot IDs stored in slot file 150 corresponds to an identical slot ID stored in stats file 152. This relationship is described in further detail below.

Figure 1B:
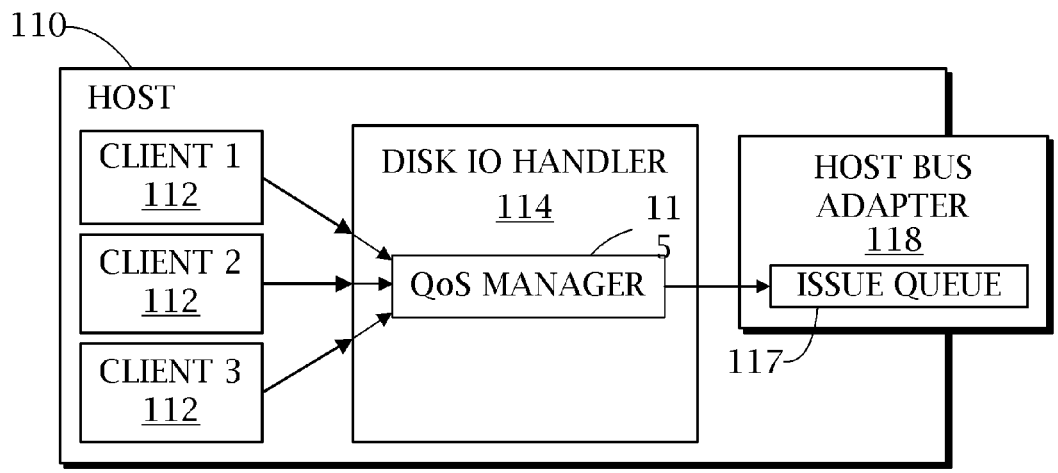
FIG. 1B shows an exemplary host.

FIG. 1B shows an exemplary host 110. Host 110 includes a plurality of clients 112, a disk IO handler 114, and a host bus adapter (HBA) 118. As used herein, the term, "client" is intended to be broadly interpreted as a software entity such as a process, a user login, an application, a virtual machine, a collection of any of the above, etc. In an exemplary non-virtualized system, each client 112 may be an application running on a host operating system (not shown) which includes disk IO handler 114. Disk IO handler 114 may be an integrated component of the host operating system, i.e., the OS kernel, or it may be a driver or other external component. In either case, each client 112 may issue IO requests (read or write) to disk IO handler which implements a quality of service (QoS) manager 115. QoS manager 115 receives each request and, in accordance with a control algorithm, immediately or eventually passes the request to issue queue 117 of host bus adapter 118 and to storage array 130.

Figure 1C:
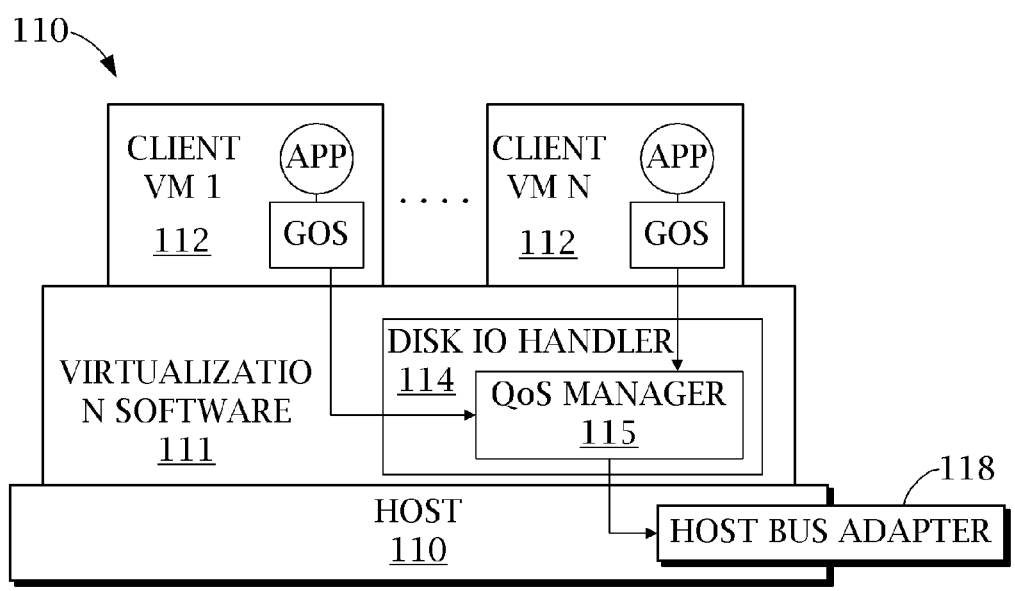
FIG. 1C shows a host comprising a virtualized computer system.

FIG. 1C shows one embodiment of host 110 that comprises a virtualized computer system wherein each client 112 is a virtual machine (VM) and disk IO handler 114 is implemented by virtualization software 111, or a component thereof or attached thereto. Virtualization software 111 may be implemented as one or more layers of software logically interposed between and interfacing with clients 112 as physical hardware of host 110. In one embodiment, virtualization software 111 comprises a virtualization kernel (not shown) for managing physical resources and a virtual machine monitor (VMM) (not shown) for each client 112 for emulating virtual hardware and devices with which software within client 112 interacts. In another embodiment, virtualization software includes a host operating system (not shown) for managing physical resources. These and other virtualization configurations are well known in the field of computer virtualization. Any number N of clients 112 may execute concurrently on host 110 using virtualization software 111, the number N being limited only by physical resources such as memory and processing bandwidth.

Each VM may include a guest operating system (GOS) and one or more applications (APP). The guest operating systems may be a commodity operating system such as Microsoft Windows® or a specialized operating system designed specifically to work with virtualization software 111 (sometimes referred to as a "paravirtualized OS"). In one embodiment, virtualization software 111 resides on a physical data storage medium (not shown) forming part of host 110, whereas virtual disks (not shown) for each client virtual machine are mapped by virtualization software 111 to files that reside remotely or locally. The guest operating system and applications access data at storage array 130 by way of a virtual host bus adapter (not shown) that is mapped by virtualization software 111 to host bus adapter 118. Note that this need not be a one-to-one mapping; e.g., there could be several virtual disk controllers in the guest and multiple physical HBAs on the host. In this case, the virtualization software may choose to send individual requests via different physical HBAs.

In the embodiments of the present invention described herein, the statistics that are collected and analyzed across hosts 110 are IO statistics, such as latency, number of IO requests, average IO request size, and queue size. Each host 110 is responsible for collecting these statistics and storing them in its respective row of stats file 152. In one embodiment, stats file 152 is simultaneously accessible by multiple hosts. Each host 110 owns its respective row in stats file 152 such that it is able to write to that row (e.g., to update the latency value). Each host 110 is able to, or is programmed to, update only its corresponding row. However, each host 110 is able to read any of the rows in stats file 152. As such, each host 110 is able to calculate system-wide statistics, such as a system-wide latency across hosts 110 ($L_{SYS}$), using the values included in the rows read from stats file 152. In other embodiments, the statistics that are collected and analyzed across hosts 110 include CPU and memory statistics and/or health reporting information, such as server temperature, etc.

The access of stats file 152 is governed by a set of rules so that synchronization is maintained. First, each host has its own unique row within stats file 152. Second, each of hosts 110 has read access to all rows in stats file 152. Third, inactive hosts are removed from slot file 150 and stats file 152 so that any stale data corresponding to the inactive host is not reflected in aggregate IO statistics. Fourth, a version control process is implemented to ensure that only compatible hosts record and read statistics from stats file 152. Finally, each of hosts 110 having entries in slot file 150 and stats file 152 executes a data corruption check to ensure the integrity of slot file 150 and stats file 152.

Figure 2:
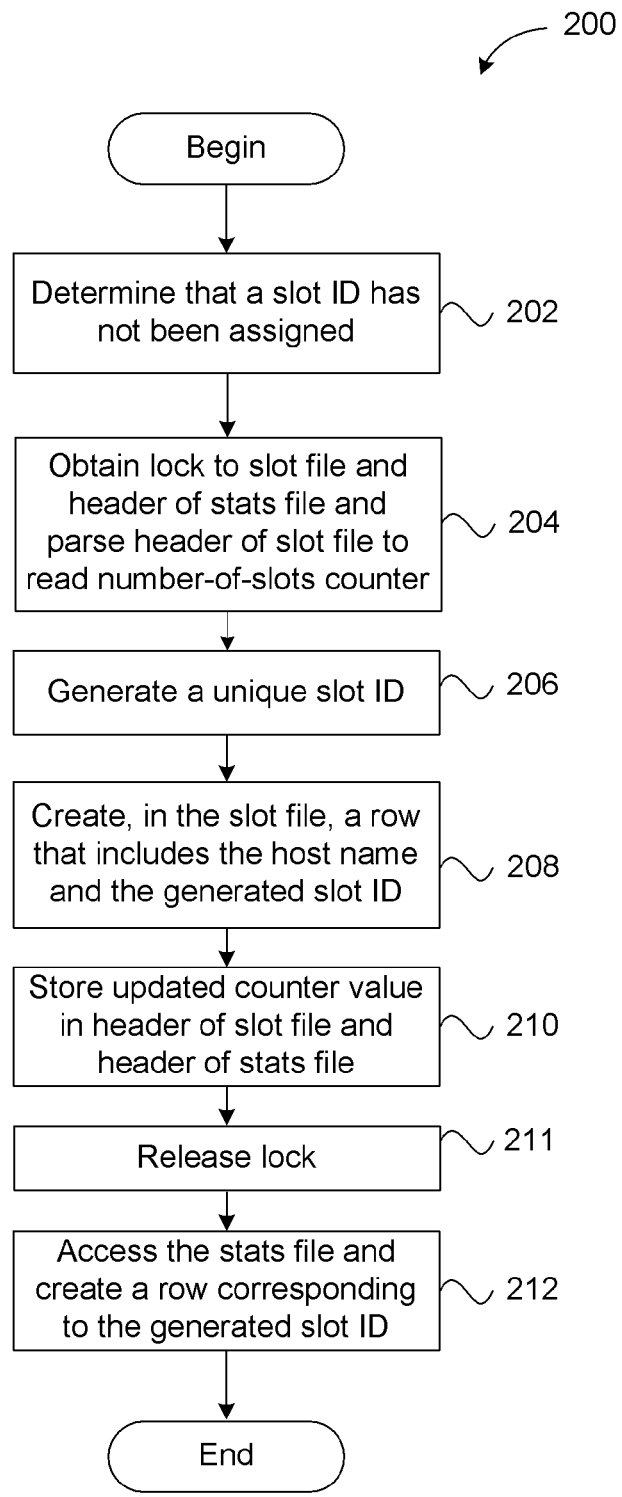
FIG. 2 shows a method for adding a host to shared files, according to one or more embodiments of the present invention.

According to one or more embodiments of the present invention, when a host is newly connected to network 120, the host reads slot file 150, generates a unique slot ID, and updates slot file 150 to include this information. Then, the host adds a row to stats file 152 and stores its unique slot ID in that row. In an alternative embodiment, the host adds a row to stats file 152 but does not store its unique slot ID in that row, instead relying on its unique slot ID as the reference to its row in stats file 152. Upon completion of these two steps, the host retains a copy of its unique slot ID in its local memory and accesses stats file 152 using this slot ID. This process is illustrated in more detail in FIG. 2, which shows a method 200 for adding a host to shared files, such as slot file 150 and stats file 152.

Method 200 begins at step 202, where host 110 determines that it has not been assigned a slot ID. At step 204, host 110 obtains a lock to slot file 150 and header of stats file 152, accesses slot file 150, and parses the header of slot file 150 to read the counter value (number-of-slots counter) that is stored in the header of slot file 150. Host 110 obtains the lock to slot file 150 and header of stats file 152 prior to accessing them to ensure the consistency of slot ID information among hosts 110 and the counter value (number-of-hosts counter) that is stored in the header of stats file 152. At step 206, host 110 generates a unique slot ID for a host name of host 110. The unique slot ID is generated to be one numerical value higher than the number-of-slots counter value. For example, if the number-of-slots counter value is seven, then the unique slot ID is generated to be eight. This technique ensures a sequential ordering of the slot IDs that are maintained within slot file 150. At step 208, host 110 creates, in slot file 150, a new row that includes the host name and the generated slot ID. At step 210, host 110 stores the incremented counter value (eight in the example given above) as the number-of-slots counter value in the header of slot file 150 and as the number-of-hosts counter value in the header of stats file 152. When step 210 has completed, host 110 releases the lock obtained in step 204, thereby enabling other hosts 110 to access slot file 150 and the header of stats file 152 (step 211).

At step 212, host 110 accesses stats file 152 and creates a row that includes the generated slot ID. Since each host that accesses stats file 152 is configured to modify only the row corresponding to that host, stats file 152 does not require a lock to be obtained prior to access, and can be simultaneously accessed by one or more hosts.

Figure 3:
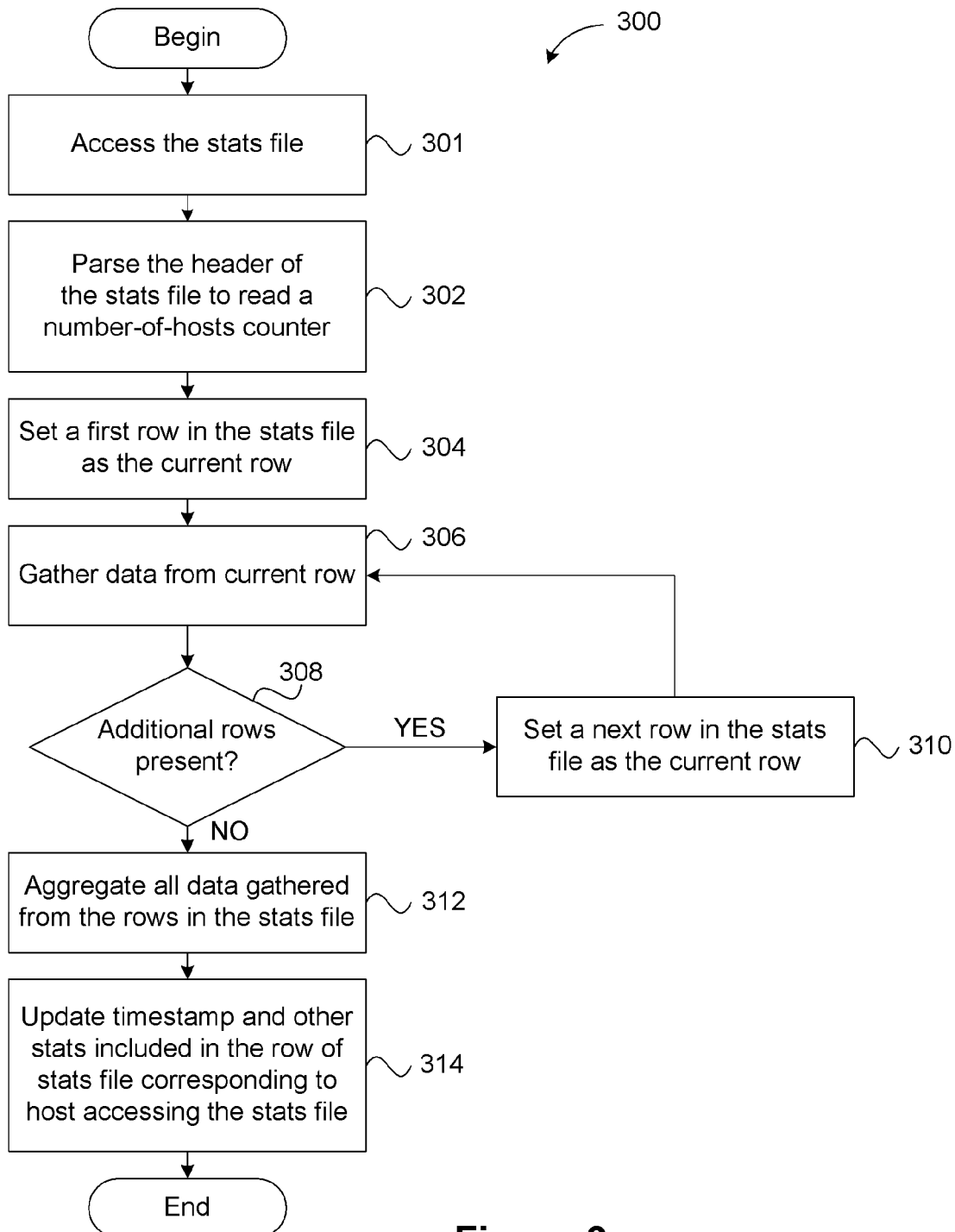
FIG. 3 shows a method for analyzing statistics stored in a shared file, according to one or more embodiments of the present invention.

A host may access stats file 152 to calculate system-wide statistics using the values read from stats file 152. For this process, the host accesses stats file 152 and reads the counter value stored in the header. Using this counter value, the host executes a loop and parses the latency data included in each row of stats file 152. This process is detailed in FIG. 3, which shows a method 300 for analyzing statistics stored in stats file 152.

Method 300 begins at step 301, where host 110 accesses stats file 152. At step 302, host 110 parses a header of stats file 152 to read the counter value (number-of-hosts counter). At step 304, host 110 sets the first row in stats file 152 as the current row. At step 306, host 110 reads data, such as various IO statistics, from the current row. The data is gathered and temporarily stored in host 110 for further processing at step 312. At step 308, host 110 determines whether additional rows are present in stats file 152. In one embodiment, the counter value read at step 302 is used to make this determination. If, at step 308, host 110 determines that additional rows are present in stats file 152, then method 300 proceeds to step 310, where host 110 sets the next row in stats file 152 as the current row. Method steps 306, 308, and 310 are repeated until data is gathered from all of the rows included in stats file 152.

Referring back to step 308, if host 110 determines that additional rows are not present in the stats file, then method 300 proceeds to step 312. At step 312, host 110 computes one or more system-wide statistics, such system-wide average latency, using the data gathered from each of the rows in stats file 152. At step 314, host 110 updates the timestamp field and its own statistics in its corresponding row.

Figure 4:
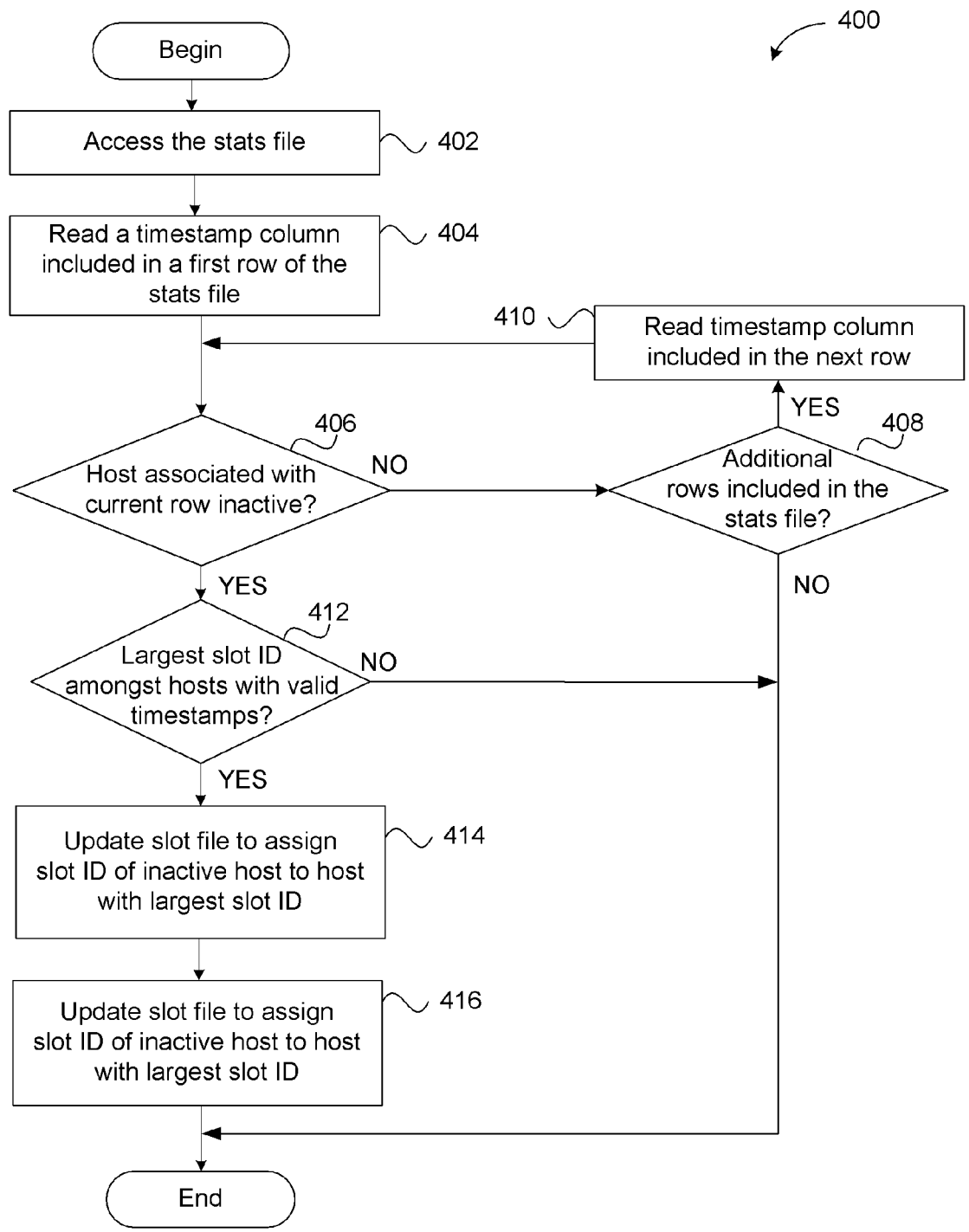
FIG. 4 shows a method that is executed, at a regular interval, by one or more hosts, to remove inactive hosts from the shared files, according to one or more embodiments of the present invention.

When a host becomes inactive, it is desirable to remove, from stats file 152, the row corresponding to that host. The detection of an inactive host is performed by each of hosts 110 based on the timestamp that is included in each row of stats file 152. In one embodiment, host 110 with the largest slot ID is assigned the responsibility to remove the row that corresponds to the inactive host. This technique ensures that the overall number of rows in stats file 152 remain equal to the number of active hosts. This process is detailed in FIG. 4, which shows a method 400 that is executed, at regular intervals, by each of hosts 110.

Method 400 begins at step 402, where host 110 accesses stats file 152. At step 404, host 110 reads a timestamp included in a current row of stats file 152. At step 406, host 110 determines whether or not the host associated with the current row is inactive. This may be determined in one of several ways. If the date and time of last access are recorded as a timestamp, a large difference between the current date and time and the date and time indicated in the timestamp may indicate inactivity. If counters are used, host 110 determines inactivity based on the last time the counter value has been updated. In either case, if the time from the last update is greater than a threshold value, host inactivity is determined. If, at step 406, host 110 determines that the host associated with the current row is not inactive, method 400 loops through the other rows of stats file 152 and examines each of their timestamps, as shown in steps 408 and 410. When the end of stats file 152 is reached (which can be determined using the number-of-hosts counter value), with no inactive host found, method 400 ends.

Conversely, if, at step 406, host 110 determines that the host associated with the current row is inactive, then method 400 proceeds to step 412. At step 412, host 110 determines whether it has the largest slot ID amongst active hosts. If, at step 412, host 110 determines that it does not have the largest host ID amongst active hosts, then method 400 ends. By contrast, if, at step 412, host 110 determines that it has the largest slot ID amongst active hosts, then the method 400 proceeds to step 414.

At step 414, host 110 updates slot file 150 to swap its assigned slot ID with the slot ID of the inactive host. Host 110 performs this swapping by: (i) obtaining a lock to slot file 150; (ii) decrementing the number-of-slots counter included in the header of slot file 150; (iii) writing its host ID in the row of slot file 150 corresponding to the inactive host; and (iv) releasing the lock to slot file 150. At step 416, host 110 updates stats file 152 to swap its assigned slot ID with the slot ID of the inactive host. Host 110 performs this swapping by: (i) decrementing the number-of-hosts counter included in the header of stats file 152; and (ii) writing its timestamp and other IO statistics in the row of stats file 152 corresponding to the inactive host. Steps 414 and 416 ensure that the sequential ordering of the slot IDs is maintained in both slot file 150 and stats file 152 and further ensure that slot file 150 and stats file 152 each remain compact in size.

Figure 5:
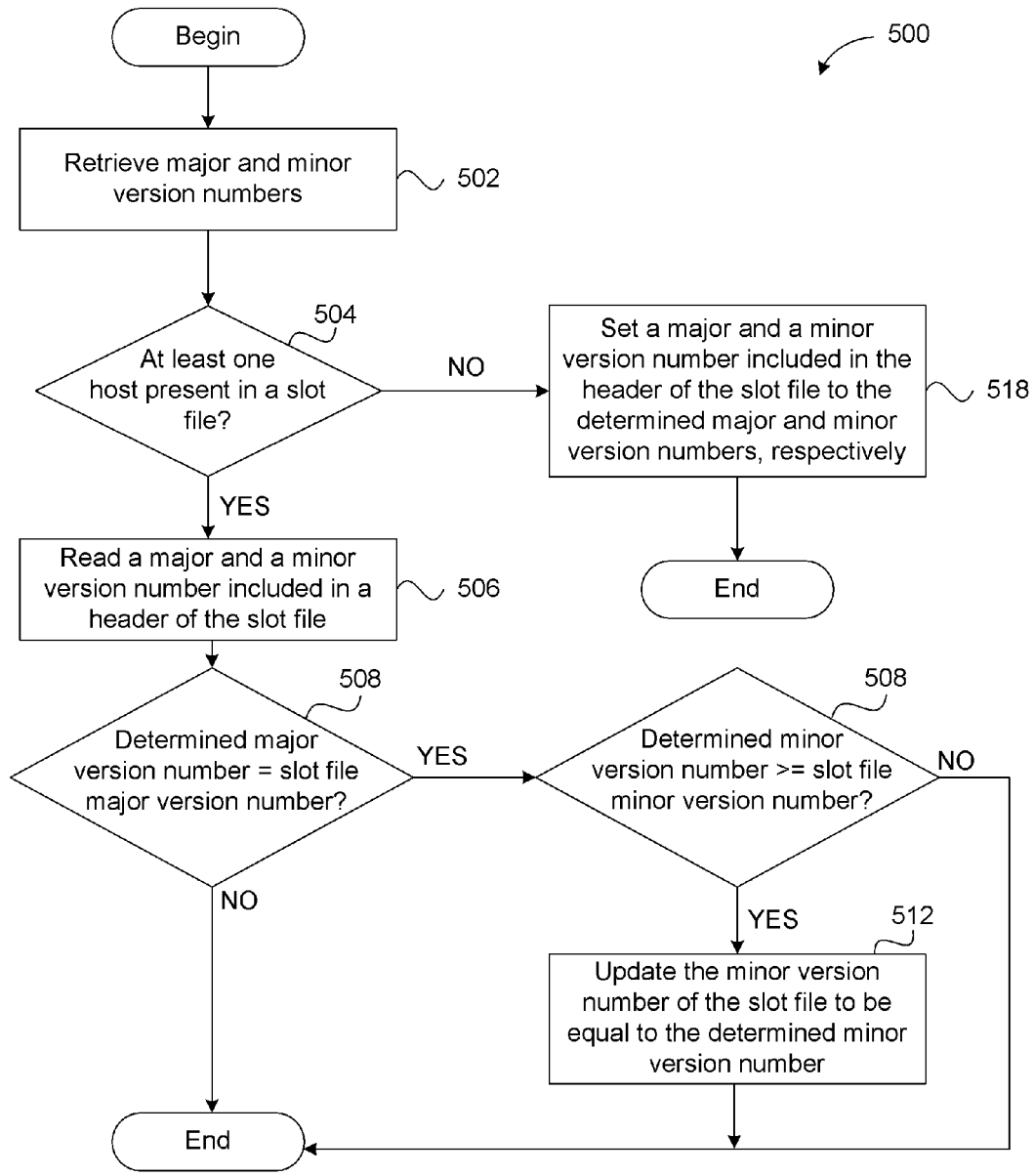
FIG. 5 shows a method for accessing a shared file using a version number control process, according to one or more embodiments of the present invention.

A version number control process is implemented in one or more embodiments of the present invention to ensure that only compatible hosts record and read statistics from stats file 152. FIG. 5 shows a method 500 for managing shared files using a version number control process.

Method 500 begins at step 502, where host 110 retrieves from local memory, its major and minor version numbers, which represent a particular protocol that is used by host 110 to access the shared files, such as an operating system version. At step 504, host 110 determines whether slot file 150 is empty (e.g., by reading the number-of-slots counter). If, at step 504, host 110 determines that slot file 150 is not empty, then method 500 proceeds to step 506. At step 506, host 110 reads major and minor version numbers that are included in the header of slot file 150. The major and minor version numbers of slot file 150 are initially set when a first host is added to slot file 150. At step 508, host 110 determines whether its major version number is equal to slot file 150 major version number. If, at step 508, host 110 determines that its major version number is equal to slot file 150 major version number, then step 510 follows. At step 510, host 110 determines whether its minor version number is greater than or equal to slot file 150 minor version number. If, at step 512, host 110 determines that its minor version number is greater than or equal to slot file 150 minor version number, then method 500 proceeds to step 514, where host 110 updates the minor version number of slot file 150 to be equal to the minor version number of host 110; if otherwise, method 500 ends. Updating the minor version number allows, for example, hosts 110 that operate at a higher minor version number to take advantage of more efficient storage methods that remain backward-compatible with storage methods employed by hosts that operate lesser minor version numbers.

Referring back to step 508, if host 110 determines that its major version number is not equal to slot file 150 major version number, then method 500 ends, and host 110 is not added to the shared files.

Referring back to step 504, if host 110 determines that there are no hosts present in slot file 150, then method 500 proceeds to step 518, where host 110 stores its major and minor version numbers in the header of slot file 150. Host 110 is then added to the shared files, as described above in conjunction with FIG. 2.

Figure 6:
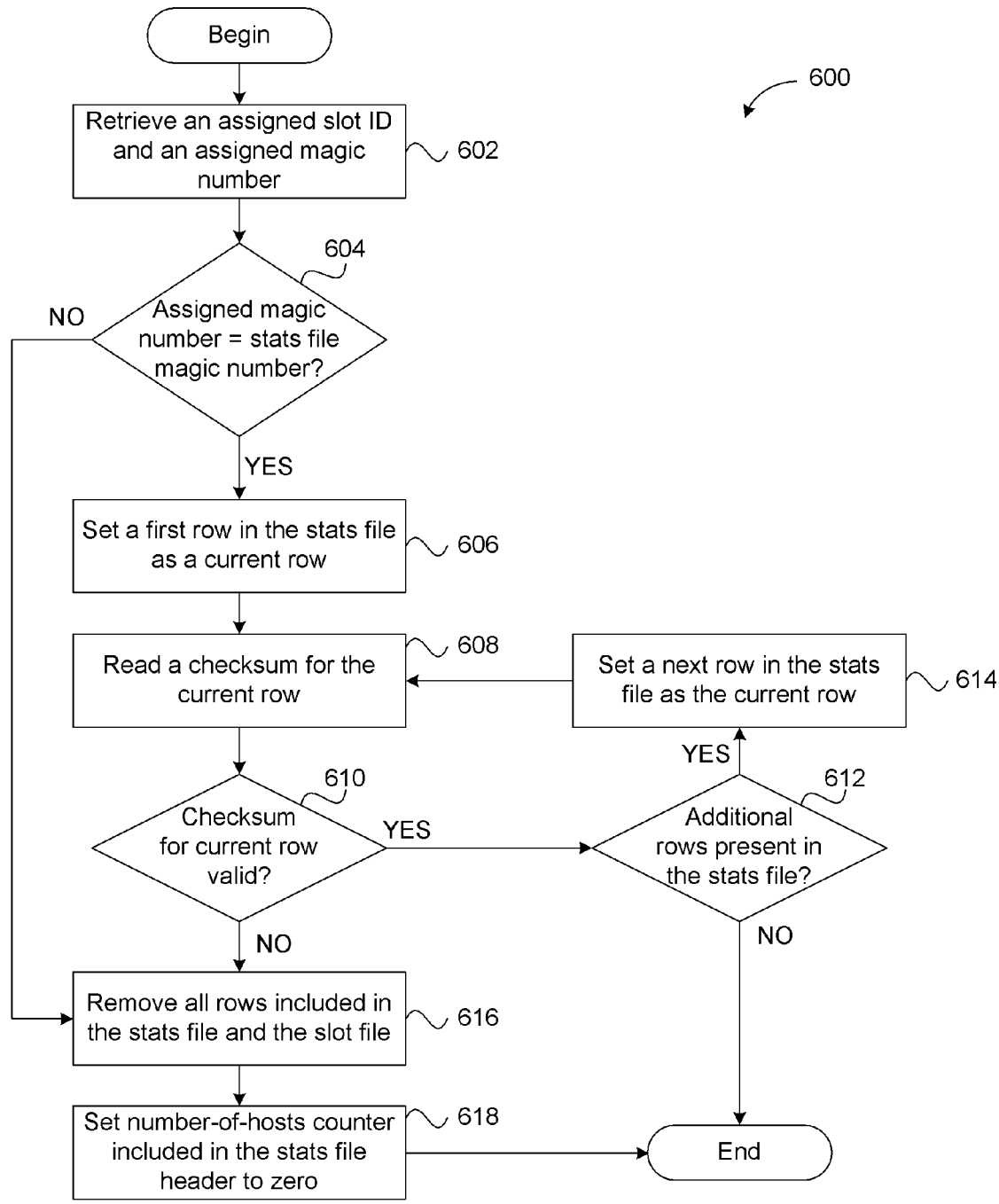
FIG. 6 shows a method for detecting data corruption within the shared files, according to one or more embodiments of the present invention.

A data corruption check is executed according to one or more embodiments of the present invention to ensure the integrity of stats file 152. Each host, when accessing stats file 152 conducts this check. This process is detailed in FIG. 6, which shows a method 600 for detecting data corruption within stats file 152.

Method 600 begins at step 602, where host 110 retrieves from its local memory an assigned slot ID and a magic number associated with stats file 152. In one embodiment, the magic number is previously configured and also stored in the header of stats file 152. Each time host 110 accesses stats file 152, the magic number retrieved by host 110 is compared to the magic number stored in stats file 152 to determine whether there has been corruption of stats file 152.

At step 604, host 110 determines whether the retrieved magic number is equal to the magic number stored in stats file 152. If, at step 604, host 110 determines that the retrieved magic number is equal to the magic number stored in stats file 152—which means that the global data integrity of stats file 152 has not been corrupted, the method 600 proceeds to step 606.

Although it may be determined that the magic number has not been corrupted, individual rows in stats file 152 might still be corrupted. It is therefore also desirable to parse each row of stats file 152 to determine the data integrity of each row, in addition to determining the global data integrity of stats file 152 using the magic number as described above in step 604.

At step 606, host 110 sets the first row in stats file 152 as the current row. At step 608, host 110 reads a checksum for the current row which, in one embodiment, is stored within that row so that it can be read immediately and compared to a computed checksum for that row. At step 610, host 110 computes a checksum for the current row and compares it with the stored checksum. If, at step 610, host 110 determines that the two checksums are equal, method 600 proceeds to step 612.

At step 612, host 110 determines whether there are additional rows present in stats file 152. If additional rows are present, method 600 proceeds to step 614, where host 110 sets the next row in stats file 152 as the current row. Method 600 then returns to step 608, described above.

Referring back to step 604 and step 610, under conditions where the magic numbers are not equal or the checksums are not equal, method 600 proceeds to step 616. At step 616, host 110 removes all rows included in stats file 152 and slot file 150. Removing all rows of both stats file 152 and slot file 150 will force each of hosts 110 to re-register with slot file 150, thereby dynamically rebuilding slot file 150 and stats file 152. At step 618, host 110 sets the number-of-hosts counter included in stats file 152 and the number-of-slots counter included in slot file 150 to zero, which appropriately reflects the removal of all rows, as described above in step 616.

Referring back to step 612, if host 110 determines there are not additional rows present in stats file 152, then method 600 ends. The ending of method 600 in this manner signifies that no data corruption has been detected in stats file 152.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of coordinating collection of statistics from multiple hosts sharing a common resource, using first and second shared data structures, comprising:

for each added host that is introduced to sharing the common resource;

(a) accessing the first data structure that stores slot identifiers which are unique to individual hosts previously introduced to sharing the common resource;

(b) generating a unique slot identifier that is specific to the added host;

(c) updating a count value of the first data structure, such that the count value indicates the current number of hosts sharing the common resource;

(d) adding an entry to the second data structure, the added entry being dedicated to the added host;

(e) associating the unique slot identifier of the first data structure to the added entry of the second data structure, such that the second data structure has a plurality of entries in which individual entries are dedicated to individual hosts; and (f) updating a count value of the second data structure to identify the number of entries to the second data structure; and enabling each of the hosts to provide updates of the entry dedicated to the each host, such that the updates to the entries by the hosts are indicative of performance in accessing the common resource by the hosts.

2. The method of claim 1, wherein the added entry has multiple fields including at least a first field for a timestamp and a second field for statistics, and wherein the enabling of each of the hosts to provide updates includes configuring each host to update the timestamp upon each access of the common resource and to enter the statistics on a basis of performance during the each access.

3. The method of claim 2, wherein each time the second data structure is accessed by a host, the host updates the first field of its corresponding entry in the second data structure with a current timestamp.

4. The method of claim 1, wherein the first data structure maintains a first counter value and has multiple entries, each entry having at least a first field for a host identifier and a second field for a slot identifier, and the second data structure has multiple entries in which each entry is a slot that is uniquely associated with one of the slot identifiers of the first data structure, each entry of the second data structure having at least a first field for a timestamp and a second field for statistics that are indicative of the performance in accessing the common resource, the statistics relating to at least one of latency, number of IO (Input/Output) requests and average IO request size.

5. The method of claim 4, further comprising:

accessing the second data structure;

determining that a timestamp in an entry of the second data structure has not been updated for a threshold amount of time; and determining that a host corresponding to said entry is inactive.

6. The method of claim 5, further comprising:

assigning a slot identifier of the inactive host to one of the remaining hosts that has the largest slot identifier.

7. The method of claim 6, wherein said assigning comprises:

decrementing the first counter value and the second counter value;

in the first data structure, writing the host identifier associated with said one of the remaining hosts that has the largest slot identifier into the first field of the entry associated with the inactive host; and in the second data structure, writing the timestamp and the statistics associated with said one of the remaining hosts that has the largest slot identifier into the first and second fields of the entry associated with the inactive host, respectively.

8. The method of claim 4, further comprising:
reading the count value of the second data structure;
reading values stored in the third field of first N entries in the second data structure, where N is equal to the count value of the second data structure; and
computing a system-wide statistic using the values.

9. The method of claim 8, wherein the system-wide statistic is a system-wide average latency across the multiple hosts.

10. The method of claim 1, wherein the first and second data structures are files.

11. A method of managing first and second shared data structures that are used in coordinating collection of statistics from multiple hosts sharing a common resource, comprising:
retrieving a version number of a host sharing the common resource, the version number being specific to an operational version of the host;
reading a version number stored in the first data structure, the stored version number being indicative of a version for achieving compatibility of the host in entering updates to the second data structure; and
determining the compatibility of the host by comparing the retrieved version number to the version number stored in the first data structure, and after said determining, adding an identifier of the host in the first data structure and updating a count value of the first data structure if the version numbers indicate compatibility, the identifier in the first data structure being selected to uniquely identify a slot that is dedicated to the host within the second data structure.

12. The method of claim 11, further comprising:
retrieving a version number of another host sharing the common resource;
reading a version number stored in the first data structure; and
determining that the retrieved version number of said another host is not the same as the version number stored in the first data structure, and not adding the identifier of said another host in the first data structure.

13. The method of claim 11, wherein the version number is a major version number.

14. The method of claim 11, wherein the version number is stored in the first data structure when the first data structure is created by a host and the version number stored in the first data structure matches the version number of the creating host.

15. A method of coordinating collection of statistics from multiple hosts sharing a common resource, using first and second shared data structures, comprising:
defining the first data structure to uniquely associate each host with a slot of the second data structure;
when another host is added in sharing the common resource, updating the first data structure to include an added unique association between the added host and a slot of the second data structure;
defining the second data structure to include the slots that the first data structure uniquely associates with individual ones of the hosts; and
entering statistics in the slots of the second data structure as the hosts access the common resource, the statistics being indicative of performance in accessing the common resource by the hosts, wherein each slot is updated to be specific to performance by the host to which the slot is uniquely identified by the first data structure, such that the second data structure includes performance statistics on a host-by-host basis.

16. The method of claim 15 further including maintaining a count within the first data structure of a number of host-to-slot unique associations between the hosts and the slots of the second data structure.

17. The method of claim 16 further including maintaining a count within the second data structure of a number of slots therein.

18. The method of claim 15 further comprising updating a timestamp of each slot when the host uniquely associated with that each slot accesses the common resource and an entry is made in that each slot.

19. The method of claim 15 wherein the performance statistics are indicative of at least one of latency, a number of IO requests, and an average IO request size.

* * * * *